(12) United States Patent
Sturmon et al.

(10) Patent No.: US 9,470,135 B2
(45) Date of Patent: *Oct. 18, 2016

(54) AIR MANAGEMENT SYSTEM FOR UNDER-HOOD HEAT CONTROL

(71) Applicant: Enviro-Cool, Inc., Sullivan, MO (US)

(72) Inventors: George R. Sturmon, St. Charles, MO (US); Edward M. Murray, Fenton, MI (US)

(73) Assignee: Enviro-Cool, Inc., Sullivan, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,069

(22) Filed: Apr. 7, 2014

(65) Prior Publication Data
US 2014/0230759 A1 Aug. 21, 2014

Related U.S. Application Data

(63) Continuation of application No. 13/590,616, filed on Aug. 21, 2012, now abandoned, which is a continuation of application No. 12/427,400, filed on Apr. 21, 2009, now Pat. No. 8,556,013, which is a (Continued)

(51) Int. Cl.
| | |
|---|---|
| *B60K 11/08* | (2006.01) |
| *F01P 1/06* | (2006.01) |
| *F01P 11/10* | (2006.01) |
| *F01P 1/00* | (2006.01) |

(52) U.S. Cl.
CPC .............. *F01P 1/06* (2013.01); *B60K 11/08* (2013.01); *B60Y 2200/14* (2013.01); *F01P 11/10* (2013.01); *F01P 2001/005* (2013.01)

(58) Field of Classification Search
CPC ....... B60K 11/00; B60K 11/02; B60K 11/04; B60K 11/06; B60K 11/08; B60K 11/085
USPC ............................ 180/68.1, 68.2, 68.4, 68.6
See application file for complete search history.

(56) References Cited

U.S. PATENT DOCUMENTS

| | | |
|---|---|---|
| 2,242,494 A | 5/1941 | Wolf |
| 3,232,368 A | 2/1966 | Sullivan |
| 3,836,191 A | 9/1974 | Götz |

(Continued)

OTHER PUBLICATIONS

Mark O'Connell, "Will Underhood Heat Issues With 2007 Diesel Engines Cause 2002 Maintenance Flashbacks?", Fleet Maintenance, Feb. 2007; 9 pages. Available online at http://archives.fleetmag.com/publication/article.jsp? publd=1 &id=138.

*Primary Examiner* — Frank Vanaman
(74) *Attorney, Agent, or Firm* — Polster, Lieder, Woodruff & Lucchesi, L.C.

(57) ABSTRACT

A system for removing heat from the engine compartment (9) of a heavy duty truck. A first ventilating system removes heat from the radiator. It is isolated from a second ventilating system that removes heat from the engine compartment. The first system takes heat from the radiator through a plenum by centrifugal squirrel cage blowers, and is directs it out to ambient by ductwork. The second system draws ambient air generally from back to front of the engine compartment, preferably by cowl induction, without the use of ram air from the vicinity of the radiator. The exits of the two systems are into a slip stream of the heavy duty truck, and the exit of the second ventilating system is into a slip stream of the first, to scavenge air out of the engine compartment.

11 Claims, 7 Drawing Sheets

Related U.S. Application Data continuation of application No. 11/932,393, filed on Oct. 31, 2007, now Pat. No. 7,537,072, which is a continuation of application No. PCT/US2007/083190, filed on Oct. 31, 2007.

(60) Provisional application No. 60/863,740, filed on Oct. 31, 2006.

(56) References Cited

U.S. PATENT DOCUMENTS

| | | |
|---|---|---|
| 4,114,714 A | 9/1978 | Fachbach et al. |
| 4,235,298 A | 11/1980 | Sackett et al. |
| 4,372,409 A | 2/1983 | Mazur |
| 4,382,481 A | 5/1983 | Moore |
| 4,417,636 A | 11/1983 | Mazur |
| 4,519,343 A | 5/1985 | Hayashi et al. |
| 4,549,762 A | 10/1985 | Burk et al. |
| 4,597,463 A | 7/1986 | Barnard |
| 4,598,786 A | 7/1986 | Kirchweger |
| 4,706,615 A | 11/1987 | Scadding |
| 4,723,594 A | 2/1988 | Koehr et al. |
| 4,726,326 A | 2/1988 | Charles et al. |
| 4,778,029 A * | 10/1988 | Thornburgh .................. 181/229 |
| 4,840,221 A | 6/1989 | Dumas et al. |
| 4,846,258 A * | 7/1989 | Charles ........................... 165/41 |
| 4,911,135 A | 3/1990 | Nishimura et al. |
| 4,971,172 A | 11/1990 | Hoffman et al. |
| 4,979,584 A | 12/1990 | Charles |
| 5,042,603 A | 8/1991 | Olson |
| 5,046,554 A | 9/1991 | Iwasaki et al. |
| 5,181,554 A | 1/1993 | Mita |
| 5,193,609 A | 3/1993 | Cowart |
| 5,234,051 A | 8/1993 | Weizenburger et al. |
| 5,495,909 A | 3/1996 | Charles |
| 5,579,858 A | 12/1996 | Petersen et al. |
| 5,588,482 A | 12/1996 | Holka |
| 5,590,624 A | 1/1997 | Emond et al. |
| 5,775,450 A | 7/1998 | Porter et al. |
| 6,059,061 A | 5/2000 | Economoff et al. |
| 6,142,213 A | 11/2000 | Gallivan et al. |
| 6,216,778 B1 | 4/2001 | Corwin et al. |
| 6,230,832 B1 | 5/2001 | von Mayenburg et al. |
| 6,401,801 B1 | 6/2002 | Dicke |
| 6,491,502 B2 | 12/2002 | Hunt |
| 6,510,832 B2 | 1/2003 | Maurer et al. |
| 6,564,857 B1 | 5/2003 | Zobel et al. |
| 6,655,486 B2 | 12/2003 | Oshikawa et al. |
| 6,732,681 B1 | 5/2004 | Hendricks, Sr. |
| 6,809,484 B2 | 10/2004 | Makaran et al. |
| 6,837,194 B2 | 1/2005 | Banzhaf et al. |
| 6,840,743 B2 | 1/2005 | Herke et al. |
| 6,871,697 B2 * | 3/2005 | Albright et al. ................ 165/51 |
| 7,028,751 B2 | 4/2006 | Fischer et al. |
| 7,406,835 B2 | 8/2008 | Allen et al. |
| 2001/0029907 A1 | 10/2001 | Algrain et al. |
| 2002/0152766 A1 | 10/2002 | Fischer et al. |
| 2003/0029581 A1* | 2/2003 | Vide ........................... 160/201 |
| 2005/0029027 A1 | 2/2005 | Kunikata et al. |
| 2005/0224267 A1 | 10/2005 | Callas |

* cited by examiner

AIR MANAGEMENT SYSTEM FOR UNDER-HOOD HEAT CONTROL

CROSS-REFERENCE TO RELATED APPLICATIONS

This application is a continuation of U.S. Non-Provisional application Ser. No. 13/590,616, filed Aug. 21, 2012, which is a continuation of U.S. Non-Provisional application Ser. No. 12/427,400, filed Apr. 21, 2009, now U.S. Pat. No. 8,556,013 which is a continuation of U.S. Non-Provisional application Ser. No. 11/932,393, filed Oct. 31, 2007, now U.S. Pat. No. 7,537,072, and PCT/US0783190 filed Oct. 31, 2007, and is related to and claims the benefit of U.S. Provisional Application 60/863,740, filed Oct. 31, 2006, the disclosures of all which are hereby incorporated by reference.

STATEMENT REGARDING FEDERALLY SPONSORED RESEARCH

Not Applicable.

BACKGROUND OF THE INVENTION

This invention relates to systems for reducing temperatures under the hood of a vehicle. It has particular, but not exclusive, application to such systems for use in a heavy duty truck, more particularly to the tractor portion of a tractor-trailer rig. Heavy duty trucks are typically over-the-road and vocational vehicles considered as weight class 4 to 8. Class 4 is generally considered to include vehicles with a gross vehicle weight of 14,001 lb to 16,000 lb (6350 kg to 7257 kg). The invention is particularly useful with weight class 6 to 8 vehicles, most particularly class 7 to 8 vehicles. Class 6 includes vehicles with a gross vehicle weight of 19,501 lb to 26,000 lb (8846 kg to 11,793 kg). Class 7 vehicles have a gross vehicle weight of 26,001 lb to 33,000 lb (11,794 kg to 14,969 kg).

Vocational heavy duty trucks are adapted for various off-road jobs such as concrete mixer trucks, log-hauling trucks and other trucks which carry heavy loads and are required to operate over rough and uneven ground under off-road conditions. Such trucks are generally also capable of on-road highway travel.

The internal combustion engine of a heavy duty truck produces great quantities of heat. Heat is taken from the engine block by a liquid coolant system, including a radiator spaced in front of the engine block. The heat is dissipated by natural convection, primarily by air flow caused by motion of the vehicle, and by the air which is blown through the radiator and over the engine by an axial fan. In most trucks, the axial fan is run directly from the engine crank shaft, through a clutch. In other vehicles, the fan is electric. In either, the efficiency of the fan is relatively low, frequently on the order of forty percent. This is caused in part by the natural inefficiency of the fan itself. The short distance between the fan and the engine block is also a factor; the engine block forms a natural barrier to air flow and creates a dead space between the fan and the engine block in which positive pressure tends to prevent air flow. A heavy duty truck engine may produce on the order of 1.5 million BTUs (1.6 million kilojoules) an hour at a speed of sixty miles per hour (97 km/hr), producing less than twelve miles per gallon (5 km/l) of fuel usage, and may utilize up to a thirty-two inch (0.8 m) diameter fan nominally pulling 9,500 cubic feet (270 cubic meters) per minute to disperse the heat put out by the radiator. It is estimated that roughly one-third of the output of the engine is utilized to propel the truck, one-third is in the heated exhaust (as heat and unburned fuel), and one-third must be handled by the cooling system.

In addition to the heat carried from the engine block to the radiator by the coolant, the engine block itself radiates substantial heat, estimated to be up to about 20,000 BTUs (22,000 kJ) an hour at highway speeds.

Recently, large diesel trucks have begun to include exhaust gas recirculation (EGR) systems. Trucks equipped with engines over 250 horsepower (186 kW) have consequently begun to experience severe under-hood heat problems. The EGR system recirculates a portion (typically about 15%-30%) of the exhaust gas to the engine air intake. Because the exhaust gas has a temperature of about 1200° F. to about 1500° F. (about 650° C. to about 815° C.), it is cooled to about 600° F. (315° C.) by running it through an EGR heat exchanger before introducing it into the cylinders of the engine. The EGR system adds about thirty percent to the cooling system heat load, about 150,000 BTUs (160,000 kJ) per hour, most of which must be dispersed by the radiator. Because much of this heat is directed back into the engine compartment, under-hood heat loads are dramatically increased. The EGR system itself also radiates heat directly into the engine compartment.

Other auxiliary devices are run by the engine and generate further heat. For example, an air compressor is required for operation of brakes and other components. The air compressor may have a surface temperature on the order of 250° F. (121° C.).

To meet environmental standards and to increase efficiency, a number of other devices have been added to the engine. A turbocharger, powered by the exhaust gasses, generates further heat, estimated to be on the order of 32,000 BTUs (34,000 kJ) per hour. The turbocharger may have an operating surface temperature of about 800° F. to 1200° F. (425° C. to 650° C.).

The additional heat produced under the hood of a modern heavy duty truck has raised temperatures under the hood to unacceptable levels. The additional heat and temperature reduce the lives of components in the engine compartment and reduce engine efficiency. They sometimes melt plastic components and overheat fluids in the engine compartment. The heat also can transfer into the vehicle operator cab and can make both the air temperature in the cab and surface temperatures on the floor and front wall of the cab uncomfortably high. Attempts to enlarge the radiator, by repositioning it, tilting it, or splitting it, have not been sufficient. Enlarging the fan is likewise impractical and would increase the power requirements for running it.

A modern heavy duty truck requires aerodynamic design considerations that sometimes make the hood design smaller. Packing more equipment in the engine compartment further makes airflow more difficult. All of these considerations require a completely new approach to under-hood air management.

Various attempts have been made to solve somewhat similar problems with automobiles and off-highway vehicles. For example, Charles, U.S. Pat. Nos. 4,979,584 and 5,495,909 disclose an automotive engine bay ventilation system using ram air through openings around the radiator of a transverse-engine automobile. Likewise, Corwin et al., U.S. Pat. No. 6,216,778, discloses a cooling system for an off-highway vehicle which is stationary or moves at very low ground speed. These systems are not easily adaptable to the needs of a heavy duty truck.

BRIEF SUMMARY OF THE INVENTION

Briefly stated, the present invention provides a system for removing heat from the engine compartment of a vehicle by isolating heat from the radiator from the engine compartment (above and to the sides of the engine block). The invention provides a new design which separates the heat loads and provides separate exhaust exits, but allows the systems to operate together or separately as needed.

Heat from the radiator is taken from a plenum behind the radiator, preferably by centrifugal squirrel cage blowers, and is directed out of the engine compartment, rather than against the engine block. The blowers are preferably controlled thermostatically to allow some or all of the blowers to operate as needed. The use of predictive computer control of the blowers is also contemplated.

The engine block and its associated devices (such as the EGR valve and the turbocharger) are cooled by a separate system which draws ambient air generally from back to front of the engine compartment, preferably by cowl induction, without the use of ram air from the vicinity of the radiator.

Both the radiator ventilating system and the engine compartment ventilating system preferably exit to ambient through side walls of the engine compartment, near the front of the engine compartment. The exits are preferably configured to exhaust hot air into the slip stream of the truck, which tends to draw air from the system. Further, the exit of the engine compartment ventilating system is preferably behind the exit of the radiator ventilating system and is configured to utilize the flow of air from the radiator ventilating system to ambient to draw air out of the engine compartment. Air flow around each exit is preferably primarily laminar.

The systems of the invention may include one or more standard radiator, plenum and blower packages sized for particular classes of vehicles or engine sizes. It may also include a standard cowl induction system also sized for particular classes of vehicles or engine sizes. Ducting for each system, however, is likely to be dependent on particular vehicle designs, including such considerations as available space in the engine compartment, internal configuration of the engine compartment and placement of engine components inside the engine compartment affecting air flow within the engine compartment, combustion air intake configuration of the engine, and air flow patterns around the outside of the engine compartment.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

As shown in the FIGURES, an internal combustion engine in a large heavy duty truck 2 (FIGS. 1 and 8) includes the engine block 3, air intake 5, and a radiator 7 which cools coolant circulated from inside the engine block 3 through passages 8. All of these components of the engine are contained in an engine compartment 9 having a front 10 (usually at or just ahead of the radiator), a top 11, and sides 12. The top and much of the sides are generally formed as a raisable hood 13 (FIG. 8), which is typically hinged to the body of the truck in the area of a lower front end of the truck. At the back of the engine compartment 9, a fire wall 14 separates the engine compartment from an operator cab 15. A turbocharger 16, exhaust piping 17, and an air compressor 19 add to the heat load in the engine compartment 9. In a conventional heavy duty truck, the heat radiated by the engine and the heat blown back into the engine compartment by an axial fan raise the temperature of the engine compartment. In recent years, an exhaust gas recirculation (EGR) system, including an EGR valve 20, adds further to the heat load on the radiator and the temperature in the engine compartment, particularly because the EGR system typically circulates on the order of 15% to on the order of 30% of the hot exhaust gas back into the engine. The total heat load in the engine compartment 9 of a modern heavy duty truck 2, other than that emitted by the radiator 7, is estimated to be about 60,000 BTUs (63,000 kJ) per hour.

This illustrative embodiment of the invention removes the axial fan and replaces it with an isolated radiator ventilating system 21 including a plenum 23 mounted to the back of the radiator 7, preferably in sealing relationship with the radiator. Therefore, all ram air reaching the radiator 7 when the truck is in forward motion is directed through the radiator 7 and is concentrated in the plenum 23. Mounted on the plenum 23, preferably on its back, are multiple motors 25 driving squirrel cage (centrifugal) fans 27 behind the plenum 23. The squirrel cage fans 27 draw heated air axially from the plenum and redirect the air 90° to discharge it outwardly (laterally) into air ducts 43 as described hereinafter.

If desired, the back side of the plenum 23, the fans 27, and air ducts 43 may be provided with insulating material in the form of a coating or a separate insulative layer or barrier. As indicated by broken line 33, this arrangement effectively shields the engine, its components, and add-ons in the engine compartment 9 from the approximately 650,000 BTUs (700,000 kJ) or more per hour being dissipated to ambient by the radiator 7 when the truck 2 is at highway speed. Exhausting the heated air in this fashion will remove the constant reinforcement of heat into the engine compartment. The problem of heat generation in the engine compartment is thus reduced to the 60,000 BTUs (63,000 kJ) per hour generated under the hood by the turbocharger 16, EGR 20, engine block 3, and other engine compartment components.

The motors 25 are operated thermostatically, with individual motors or groups of motors being operated only when required. Predictive algorithms for controlling the operation of the cooling fans 27 will be apparent to those skilled in the art. Such algorithms may include such factors as engine coolant temperature, rate of rise of coolant temperature, engine surface or oil temperature, engine compartment temperature, ambient temperature, engine speed, and truck speed, for example.

The arrangement thus far described has the further advantages that it reduces the power (estimated to be sixty-five horsepower) required to operate a bladed fan. This could provide considerable fuel savings (7-9%). It also eliminates the fan clutch that has shown to be a high maintenance item. The electric squirrel cage fan blowers 27 are far more efficient in removing heat from the radiator 7 than the bladed axial fan. Because plural fan blowers 27 are preferably provided, air flow can be stepped up and down and controlled more effectively by controlling which blowers are powered. Moreover, the fan blower's DC motor can become a generator when it is off and free wheeling from ram air, thereby charging the truck's batteries.

The isolated radiator ventilating system 21 described thus far may be implemented in a standard package 35; a few such packages will accommodate a wide range of heavy duty trucks. The package 35 may include a radiator 7, a plenum 23, and a plurality of fans 27. Such a package may include a radiator 7 having a height of from about two to three feet (0.5 m to one meter) and a width of about 18" to about 36"(0.4 m to one meter), with a plenum 23 about one to two inches (2.5 cm to 5 cm) deep, sized to fit the back of the radiator. The package 35 may be mated to a ductwork system which is tailored to a particular truck style to create both the radiator ventilating system 21 and a part of an engine compartment ventilating system.

Figure 2:
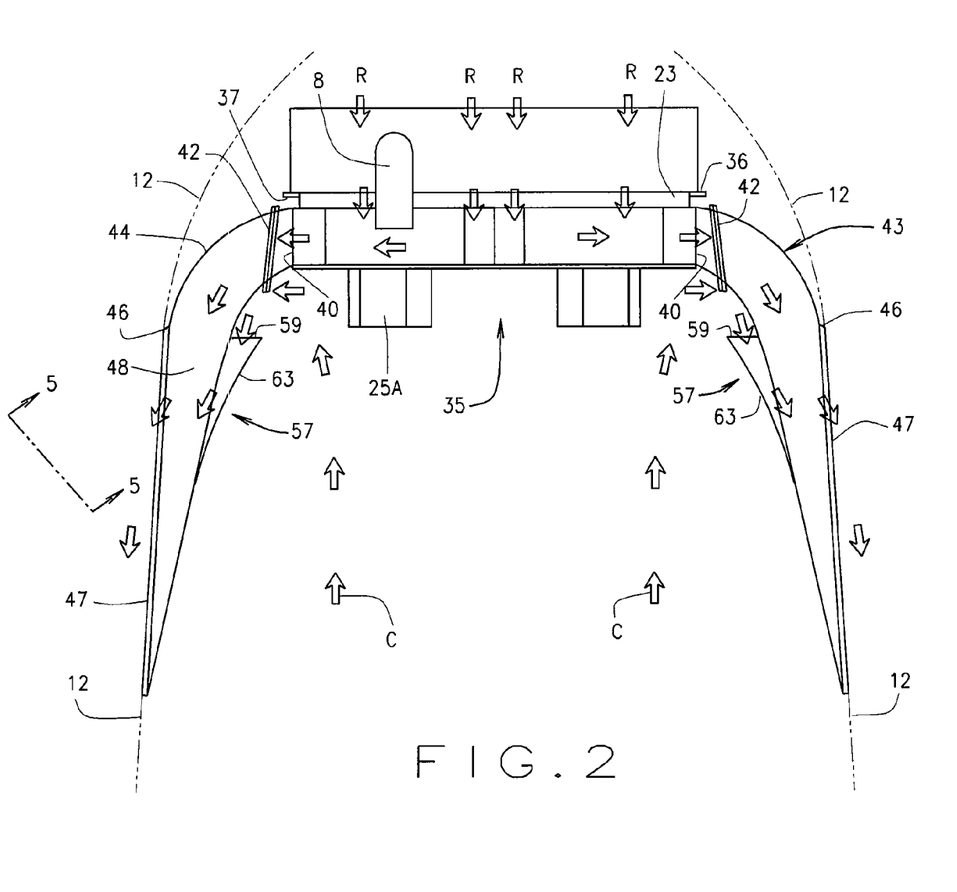
FIG. 2 is a view in top plan, showing air flow through a part of an illustrative embodiment of the system of FIG. 1.
Figure 3:
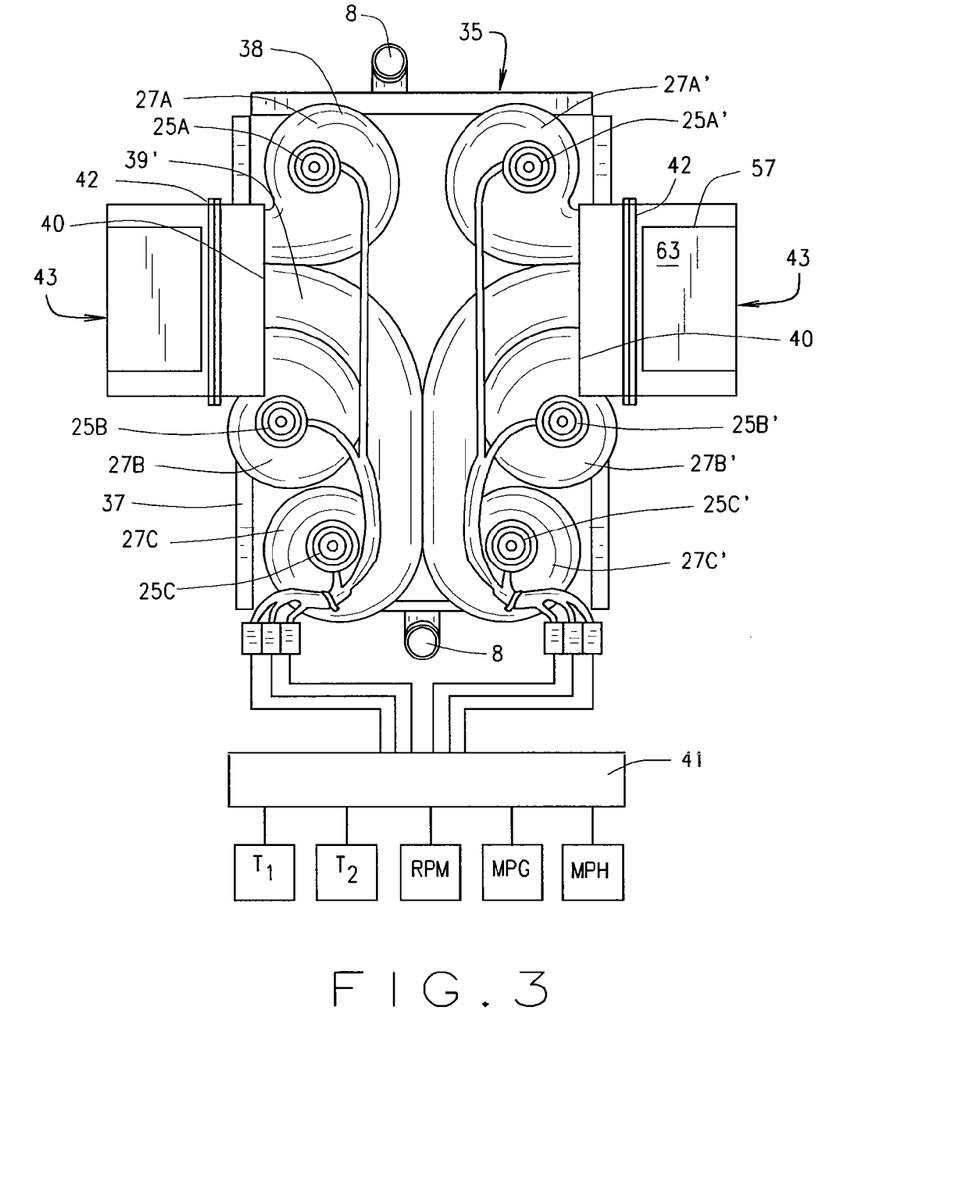
FIG. 3 is a view in rear elevation, showing an illustrative radiator cooling system package of the present invention.
Figure 4:
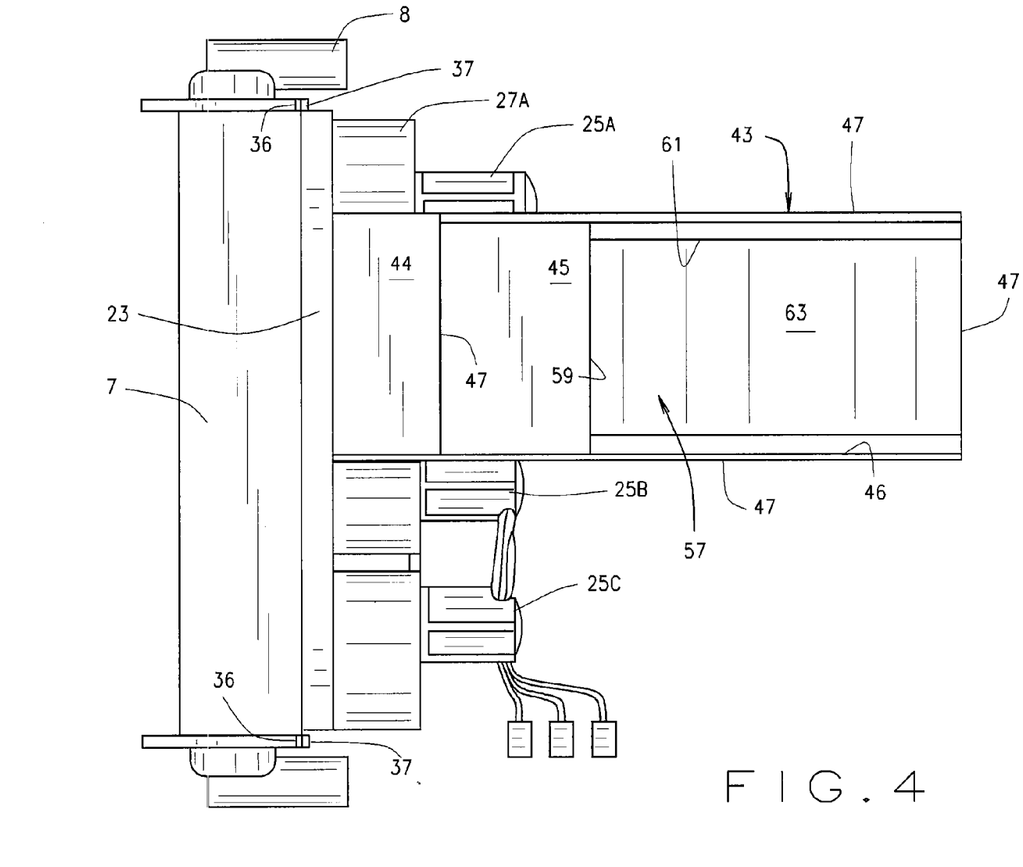
FIG. 4 is a view in side elevation of the package of FIG. 3.
Figure 5:
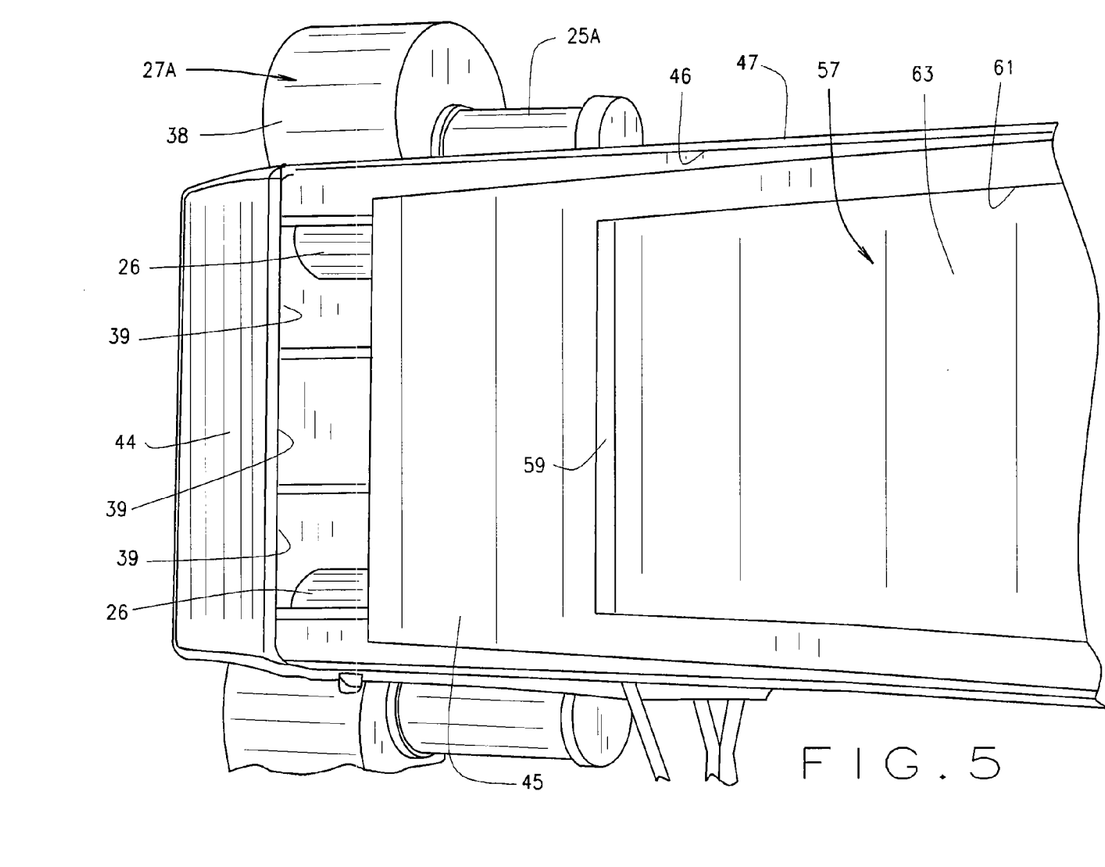
FIG. 5 is a view in perspective of parts of the system of FIGS. 2-4, taken along line 5-5 of FIG. 2.
Figure 6:
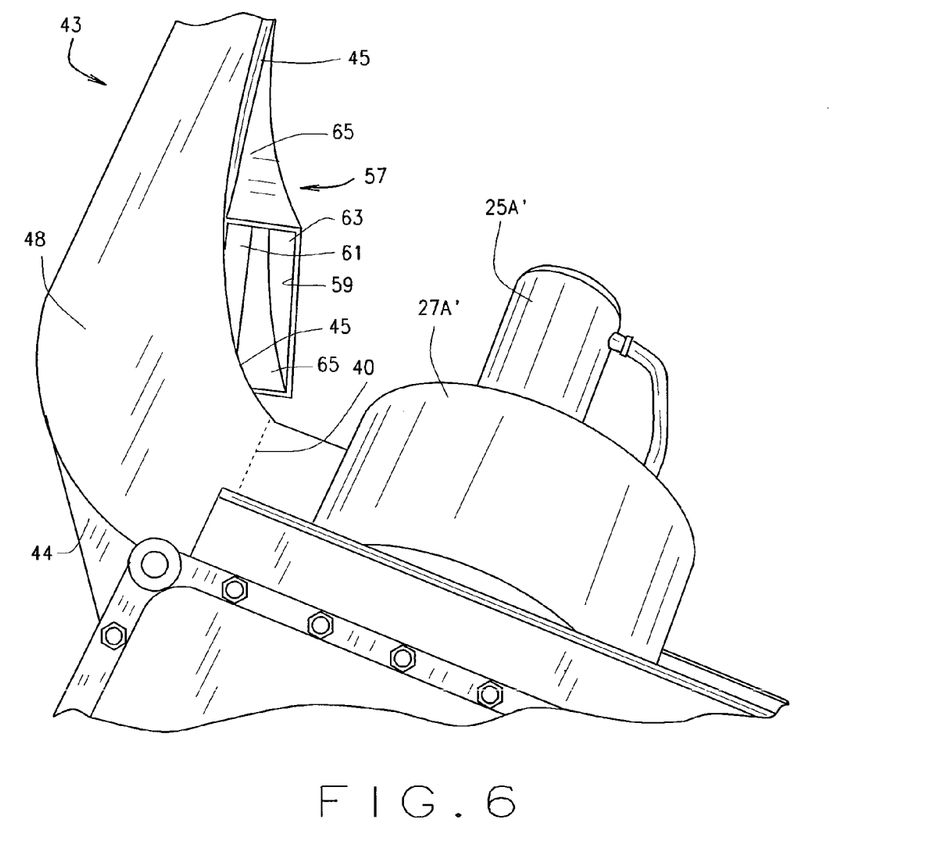
FIG. 6 is a view in perspective of an engine compartment air outlet of the system of FIGS. 2-5.
Figure 7:
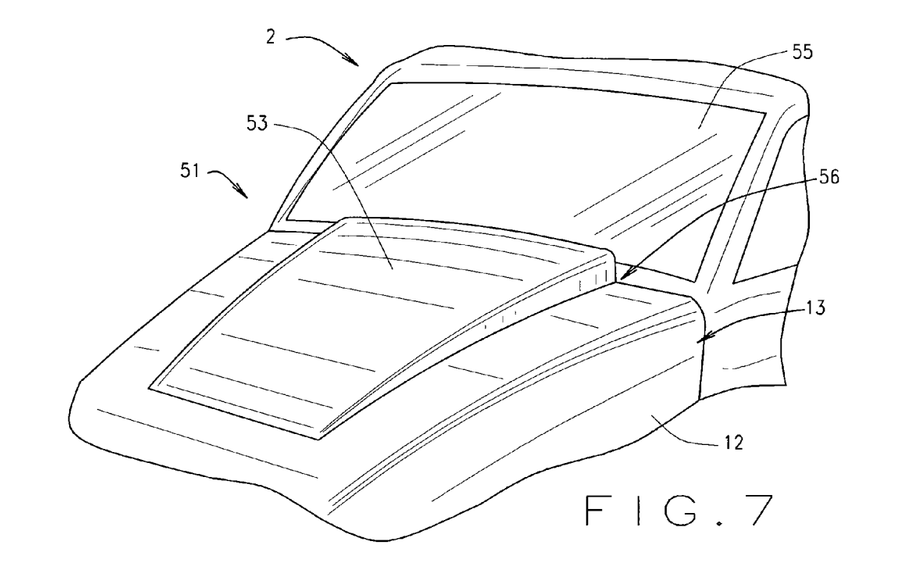
FIG. 7 is a schematic view in perspective showing a cowl induction scoop in accordance with an embodiment of another part of the invention.

As shown in FIGS. 2-7, for example, a radiator and plenum 33" (84 cm) tall by 22" (56 cm) wide may be provided as a standard package 35. The radiator 7 is illustratively 6" (15 cm) deep with a flange 36 extending around its periphery, and the plenum is 1.25" (3 cm) deep and includes a peripheral flange 37 attached to the flange 36 of the radiator. As best seen in FIG. 3, attached to the plenum are six squirrel cage fans 27A, 27B, 27C, 27A', 27B', and 27C', each including a motor 25A, 25B, 25C, 25A', 25B', and 25C', respectively, a squirrel cage impeller 26, and a housing 38 having a side outlet 39. Illustratively, each fan draws 530 cfm (15 cubic meters per minute) of air, and has a brushless 3" (7.6 cm) diameter, 3,000 rpm, 24 volt DC motor. The draws of the centrifugal fans are sized for particular applications. The housing 38 of each fan 27 is about 9" wide by about 10" tall by about 4" deep (22.5× 25.5×10 cm), and each housing has a 4" (10 cm) square outlet 39. It will be seen that the upper left fan 27A and the two lower right fans 27B' and 27C' have the same handedness (clockwise rotation), and that the upper right fan 27A' and the two lower left fans 27B and 27C have the opposite handedness (counterclockwise rotation). The lowermost fans 27C and 27C' have extended outlets 39', exiting between the exits of the two fans above them, so that all of the outlets on each side of the plenum align vertically to form a 12" by 4" (30×10 cm) rectangular outlet 40 on each side of the package.

As shown particularly in FIG. 3, each motor 25 is individually electrically connected to a control system 41 having inputs, illustratively T1 representing coolant temperature, T2 representing engine compartment temperature, RPM representing engine speed, MPG representing instantaneous or integrated fuel consumption, and MPH representing vehicle speed. These inputs permit the controller to operate the fans 27 individually or in groups in order to insure that engine temperature remains in a desired range, in accordance with algorithms which will be easily applied by those skilled in the art. In simplest form, the fans are turned on in pairs as the temperature of the coolant, represented by T1, exceeds predetermined values and turned off when T1 drops below a second value. They also permit operation of the fans in unusual circumstances when T2 exceeds a predetermined value while T1 is relatively low, to cool the engine compartment 9, as described hereinafter. Inputs RPM, MPG and MPH permit predictive operation of some or all of the fans 27, to begin drawing ram air through the radiator to provide cooling while the temperature of the coolant is still rising. The controller will also make possible the regenerative use of the fans to charge the battery of the truck when ram air is flowing through them and they are not energized.

This radiator cooling package 35 is mated to a duct system 43. At least the rearward portion of duct system 43 is preferably, but not necessarily, mounted on the inside of the hood 13. The juncture between the hood-mounted ducts 43 and the package 35 may be sealed in any known manner. For example, as shown solely in FIGS. 2 and 3, the rectangular outlet 40 of the package 35 may terminate in a compound bevel 42 having a gasket on its open (upper) face to seal with a complementarily sloped bevel on the hood-mounted ducts. This arrangement permits unimpeded opening of the hood 13 and seals the duct system 43 to the package 35 when the hood 13 is closed. Alternatively, an end section of the package duct or the hood-mounted duct may be longitudinally moveable via an automatic or manual operating mechanism to mate with the other section of the duct. Likewise, the duct system may be permanently attached to the radiator ventilating system package 35 and may simply align with an opening in each side 12 of the hood.

The duct system 43 of this illustrative embodiment includes a curved outside wall 44 mated to a forward wall of the outlet 40 and a curved inside wall 45 mated to a rearward wall of the outlet 40. The outside wall 44 terminates in a generally flat vertical rectangular opening 46 having a peripheral edge 47 aligned with a rectangular opening of similar size in the side wall 12 of the hood of the truck. It will be noted that the shape of this opening will be to some extent dictated by the contour of the truck's hood. In this embodiment, the opening 46 is substantially twelve inches (30 cm) tall, the same height as the outlet 40 of the radiator ventilating package. The inside wall 45 of the duct system 43 is spaced four inches from the outside wall 44 along a curved inlet portion attached to the outlet 40. When the inside wall 45 reaches a position opposite the opening 46, it then curves gently outward into the rear edge 47 of the opening 46. The outside and inside walls 44 and 45 are connected to each other by upper and lower horizontal walls 48. It will be seen that the walls 44, 45 and 48 form a smooth open channel guiding air exhausted from the radiator ventilating system 21 into the ambient slip stream of the heavy duty truck when the truck is moving forward.

Figure 1:
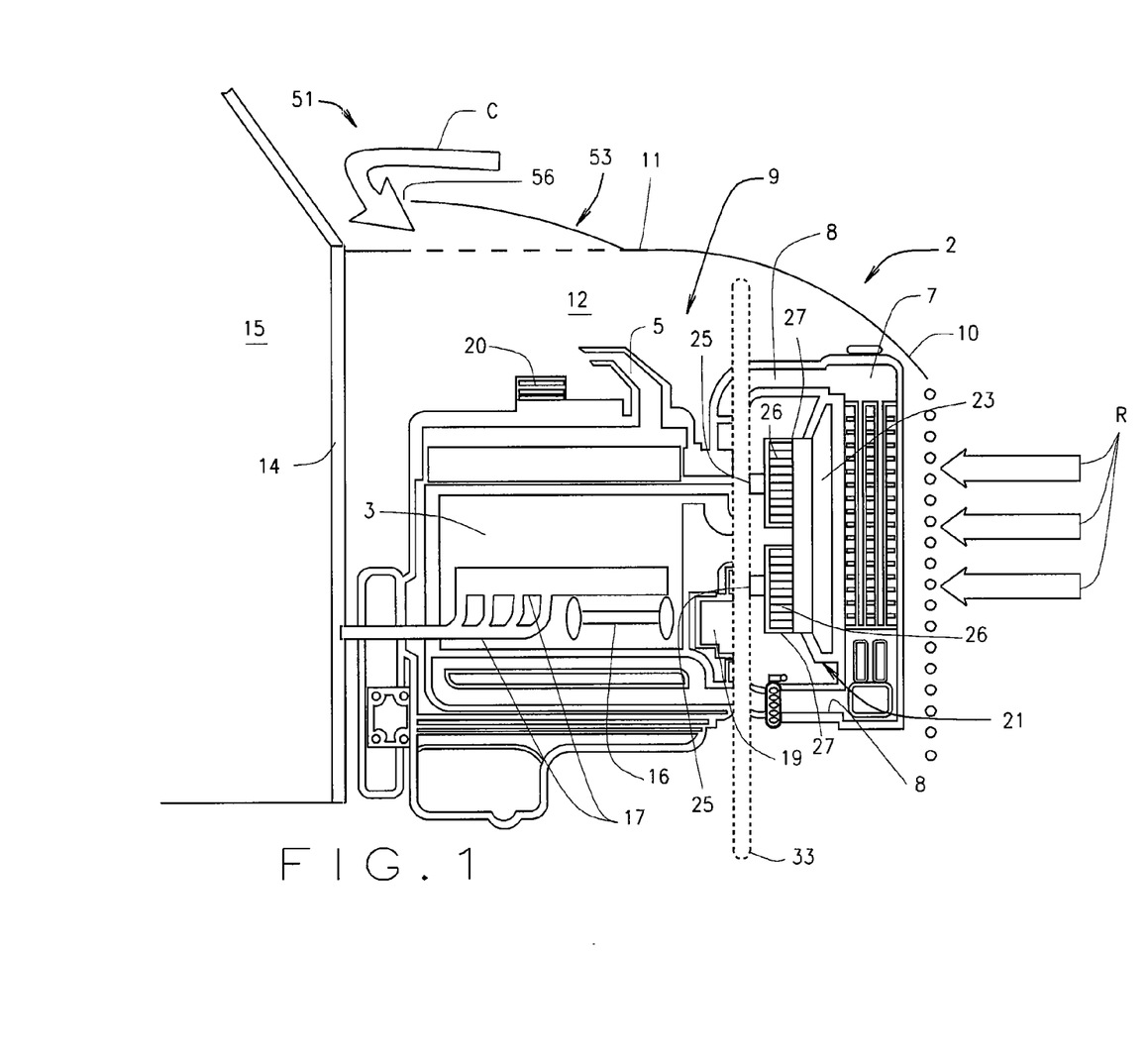
FIG. 1 is a schematic sectional view in side elevation of an internal combustion engine compartment in a heavy duty truck, modified in accordance with one embodiment of the present invention.
Figure 8:
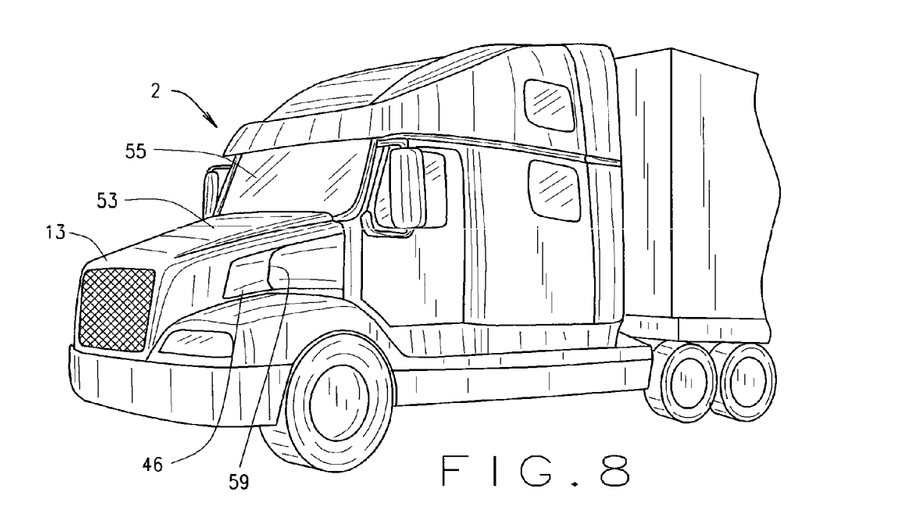
FIG. 8 is a view in perspective of an over-the-road truck incorporating the embodiment of FIGS. 1-7.

To cool the engine block 3 and its associated under-hood components in the engine compartment, a separate engine compartment ventilating system 51 is provided. The second ventilating system 51 in this illustrative embodiment is sized to remove the approximately 60,000 BTUs (63,000 kJ) per hour of heat produced in the engine compartment. In brief, the 60,000 BTUs (63,000 kJ) per hour can be effectively controlled by cowl air induction strategically located on top of the hood, using the high pressure area at the windshield to flow cool ram air into the engine compartment and causing the engine compartment air to exit through hood side ducts arranged to draw air into a low pressure area adjacent the exit of radiator fan air into ambient. As shown in FIGS. 1, 2, and 8, the engine compartment ventilating system 51 includes an induction cowl 53 in front of the windshield 55 of the truck 2. Cowl induction systems have long been used in race cars, but their use in a heavy duty truck is believed to be novel. As is known, the rear 56 of the cowl 53, adjacent the windshield, is open to the engine compartment. At operating speeds, even relatively low operating speeds, air is compressed at the base of the windshield 55 and is drawn into the engine compartment through the rear of the cowl 53 as shown at 56.

Air within the engine compartment 9 is expelled through air exit ducts 57 mounted on the inside walls 45 of the ducts 43, as shown particularly in FIGS. 2-6. As seen particularly in FIGS. 3 and 4, the exit ducts 57 are in this embodiment about nine inches high and three inches wide (23 cm×8 cm) at their mouths 59, and are vertically centered on the inside walls 45 of the ducts 43. The inside walls 45 of the ducts 43 include rectangular openings 61 into which exit ducts 57 empty. Each exit duct 57 includes a vertical inner wall 63, which curves to meet the inside wall 45 at its rear, and upper and lower horizontal walls 65 which join the inner wall 63 of the exit duct to the inner wall 45 of the radiator ventilating duct 43. Although the exit ducts 57 are entirely open to ambient, they are also in the slip stream of the hot air being forcibly expelled through the exits 46 of the radiator ventilating system 21 and in the slip stream of the truck. Therefore, air is further drawn out of the engine compartment by a venturi effect created by the flow of hot air from the plenum through the exits 46. Forward movement of the truck 2 will also create a slip stream tending to pull hot air from both the exits 46 of the ducts 43 and the exits 57 from the engine compartment 9. In the unlikely circumstance that the engine compartment were to reach an undesirable temperature while the fans 27 are turned off, the fan motors 25 can be turned on to draw air through the ducts 43 and suck air out of the engine compartment 9.

As shown in FIGS. 1 and 2, ram air represented by arrows R at the front of the heavy duty truck, is directed entirely through the radiator 7 and into the radiator ventilating system 21, while the engine compartment 9 is cooled by cowl induction air, represented by the arrows C, moving generally from the rear to the front of the engine compartment. Movement of air from back to front of the engine compartment 9 also removes heat from the area of the fire wall 14 and reduces the heat load on the cab 15.

Appropriate guards are preferably provided over all accessible openings. Numerous such guards are well known and may include, for example, thin horizontal vanes.

Numerous variations in the vehicle under-hood temperature control system of the invention, within the scope of the appended claims, will occur to those skilled in the art in light of the foregoing disclosure. Merely by way of example, other closed systems for cooling the radiator may be provided. As previously noted, the configuration and size of the exhaust ducts will of course be varied somewhat to accommodate the geometries and engine compartments of different trucks, as exemplified in FIG. 8. The engine compartment cooling system may include other air inlets in the top or sides of the engine compartment, including induction air systems and ram air inlets. Preferably, the air inlets are spaced away from the front of the truck. Ram air inlets in general are not presently preferred except for use in a cab-over design. The engine compartment cooling system may include other exhaust ports and may include powered fans of various sorts if desired. For example, powered fans could be provided at the outlets of the engine compartment ventilating system. Many temperature-controlled systems are known or easily adapted for controlling the operation of the fans, or for moving baffles and the like. In the illustrative embodiment, other motors, including for example variable speed motors and, less desirably, hydraulic motors may be used to operate the squirrel cage fans; the size and number of fans may be altered as required for an application; and the shapes, numbers and sizes of the blades of the squirrel cage fan may be changed to suit the requirements of particular applications. Electric fan motors may be driven from different voltages, illustratively 12V to 42V. The bottom of the engine compartment may be enclosed for aerodynamic or internal air flow purposes. These variations are merely illustrative.

As various changes could be made in the above constructions without departing from the scope of the invention, it is intended that all matter contained in the above description or shown in the accompanying drawings shall be interpreted as illustrative and not in a limiting sense.

All patents and patent applications mentioned herein are hereby incorporated by reference.

The invention claimed is:

1. A vehicle capable of on-road highway travel, the vehicle comprising an operator compartment; an engine compartment; an engine in the engine compartment; a radiator in front of the engine, the radiator receiving coolant from the engine; a first ventilating system behind the radiator, the first ventilating system comprising ducting having an exhaust exit to ambient and at least one electric or hydraulic fan adapted to draw air through the radiator, through the ducting, and out the exhaust exit of the first ventilating system, the first ventilating system being constructed to prevent air drawn through the radiator from entering the engine compartment; and a second ventilating system constructed to remove heat from the engine compartment, the second ventilating system being constructed to flow ambient air into a rear part of the engine compartment and to exhaust air heated by the engine compartment out of an exhaust exit toward a forward part of the engine compartment.

2. The vehicle of claim 1 wherein the second ventilating system further comprises air induction structure on at least one of the top or sides of the engine compartment, the air induction structure being adapted to flow ambient air into the engine compartment when the vehicle is moving forward.

3. The vehicle of claim 1 wherein the exhaust exit of the second ventilating system is positioned in a low pressure area of the first ventilating system, the system being so constructed and arranged that exhaust air from the first ventilating system draws air out the exit of the second ventilating system.

4. The vehicle of claim 1 wherein the vehicle has a gross vehicle weight of at least 6350 kilograms and is capable of a highway speed of ninety-seven kilometers per hour.

5. The vehicle of claim 4 wherein the vehicle is a heavy duty truck having a gross vehicle weight of at least 11,794 kilograms.

6. The vehicle of claim 5 wherein the vehicle is a vocational heavy duty truck adapted for off-road use as well as on-road highway travel.

7. The vehicle of claim 5 wherein the vehicle is a tractor portion of a tractor-trailer over-the-road rig.

8. The vehicle of claim 4 wherein the second ventilating system comprises an air inlet adjacent a base of the windshield, the windshield forming a high pressure area at its base to flow air into the inlet of the second ventilating system while the vehicle is moving forward.

9. The vehicle of claim 1 wherein the second ventilating system comprises an air outlet in a wall of the engine compartment.

10. A vehicle capable of a highway speed of ninety-seven kilometers per hour, the vehicle comprising an operator compartment; an engine compartment; an engine in the engine compartment; a radiator in front of the engine, the radiator receiving coolant from the engine; a first ventilating system behind the radiator, the first ventilating system comprising ducting having a first exhaust exit through a wall of the engine compartment to ambient and at least one hydraulic or electric fan adapted to draw air through the radiator, through the ducting, and out the first exhaust exit; air blocking structure around the radiator constructed to block ram air from entering a front portion of the engine compartment; and a second ventilating system, constructed to remove heat from the engine compartment, the second ventilating system comprising an air inlet adjacent a base of the windshield, the windshield forming a high pressure area at its base to flow air into the inlet of the second ventilating system while the vehicle is moving forward.

11. The vehicle of claim 10 wherein the second ventilating system comprises an air outlet into a low pressure area of the first ventilating system.

* * * * *